(12) United States Patent
Garza et al.

(10) Patent No.: US 9,262,167 B2
(45) Date of Patent: *Feb. 16, 2016

(54) COMPUTER PROCESSOR WITH INSTRUCTION FOR EXECUTION BASED ON AVAILABLE INSTRUCTION SETS

(71) Applicant: International Business Machines Corporation, Armonk, NY (US)

(72) Inventors: Jose E. Garza, Surrey (GB); Stephen J. Hobson, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/100,058

(22) Filed: Dec. 9, 2013

(65) Prior Publication Data

US 2014/0173261 A1 Jun. 19, 2014

Related U.S. Application Data

(63) Continuation of application No. 13/719,537, filed on Dec. 19, 2012.

(51) Int. Cl.

| | |
|---|---|
| *G06F 7/38* | (2006.01) |
| *G06F 9/00* | (2006.01) |
| *G06F 9/44* | (2006.01) |
| *G06F 9/38* | (2006.01) |
| *G06F 9/30* | (2006.01) |
| *G06F 11/22* | (2006.01) |
| *G06F 11/14* | (2006.01) |
| *G06F 9/46* | (2006.01) |

(52) U.S. Cl.
CPC .............. *G06F 9/38* (2013.01); *G06F 9/30058* (2013.01); *G06F 11/2236* (2013.01); *G06F 9/466* (2013.01); *G06F 11/1474* (2013.01)

(58) Field of Classification Search
CPC ............................. G06F 11/1474; G06F 9/466
USPC ........................................................ 712/234
See application file for complete search history.

(56) References Cited

U.S. PATENT DOCUMENTS

| | | | |
|---|---|---|---|
| 5,359,730 A | 10/1994 | Marron | 395/650 |
| 6,601,162 B1 * | 7/2003 | Teruyama | 712/239 |
| 8,074,055 B1 * | 12/2011 | Yates et al. | 712/43 |
| 2006/0101432 A1 | 5/2006 | Simons et al. | 717/138 |

(Continued)

FOREIGN PATENT DOCUMENTS

EP  0599012 B1  8/2005  ........... G06F 9/318

*Primary Examiner* — Chun-Kuan Lee
(74) *Attorney, Agent, or Firm* — Ido Tuchman; Jeanine S. Ray

(57) ABSTRACT

A system and method for testing whether a computer processor is capable of executing a requested instruction set. The system includes a computer processor configured to receive an encoded conditional branch instruction in a form of machine code executable directly by the computer processor, and implement the encoded conditional branch instruction unconditionally, based on underlying hardware architecture of the computer processor. The Method for testing whether a computer processor is capable of executing a requested instruction set, the method including, receiving an encoded conditional branch instruction in a form of machine code executable directly by the computer processor, and implementing the encoded conditional branch instruction unconditionally, based on underlying hardware architecture of the computer processor.

4 Claims, 4 Drawing Sheets

(56) References Cited

U.S. PATENT DOCUMENTS

| | | | |
|---|---|---|---|
| 2008/0184014 A1 | 7/2008 | Copeland et al. | 712/227 |
| 2009/0182983 A1 | 7/2009 | Greiner et al. | 712/205 |
| 2011/0191760 A1* | 8/2011 | Guy et al. | 717/155 |

\* cited by examiner

COMPUTER PROCESSOR WITH INSTRUCTION FOR EXECUTION BASED ON AVAILABLE INSTRUCTION SETS

CROSS-REFERENCE TO RELATED APPLICATIONS

This application is a continuation application of and claims priority under 35 U.S.C. §120 to U.S. patent application Ser. No. 13/719,537 ("A COMPUTER PROCESSOR WITH INSTRUCTION FOR EXECUTION BASED ON AVAILABLE INSTRUCTION SETS") filed Dec. 19, 2012.

BACKGROUND

Present invention relates to computer processor, and more particularly to a system and method for testing whether a computer processor is capable of executing a requested instruction set.

Hardware architectures are continually evolving. For example, the IBM z/Architecture has its roots in the System/360, announced in 1964, and has been continually evolving. The most recent upgrade to z/Architecture includes more than 100 new CPU instructions, most of them designed to provide better execution performance to application programs. Many other computer processor architectures follow a similar evolution path.

Such new facilities present a problem to software product developers: it is not possible for software products to easily exploit the new facilities. Shortly after a new facility is announced, most of the installed machines will be older versions of the architecture and thus, unable to run software that uses the new facility. Any software product that has the new version of architecture as prerequisite will have a very small market. Only after some time (a few years) will most of the installed machines support the new instructions.

BRIEF SUMMARY

One example of the present invention is a system for testing whether a computer processor is capable of executing a requested instruction set. The system includes a computer processor configured to receive an encoded conditional branch instruction in a form of machine code executable directly by the computer processor, and implement the encoded conditional branch instruction unconditionally, based on underlying hardware architecture of the computer processor.

Yet another example of the present invention is a method for testing whether a computer processor is capable of executing a requested instruction set. The method includes receiving an encoded conditional branch instruction in a form of machine code executable directly by the computer processor, and implementing the encoded conditional branch instruction unconditionally, based on underlying hardware architecture of the computer processor.

A further example of the present invention is a computer program product for testing whether a computer processor is capable of executing a requested instruction set. The computer program product includes computer readable program code configured to: receive an encoded conditional branch instruction in a form of machine code executable directly by the computer processor; and implement the encoded conditional branch instruction unconditionally, based on underlying hardware architecture of the computer processor.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
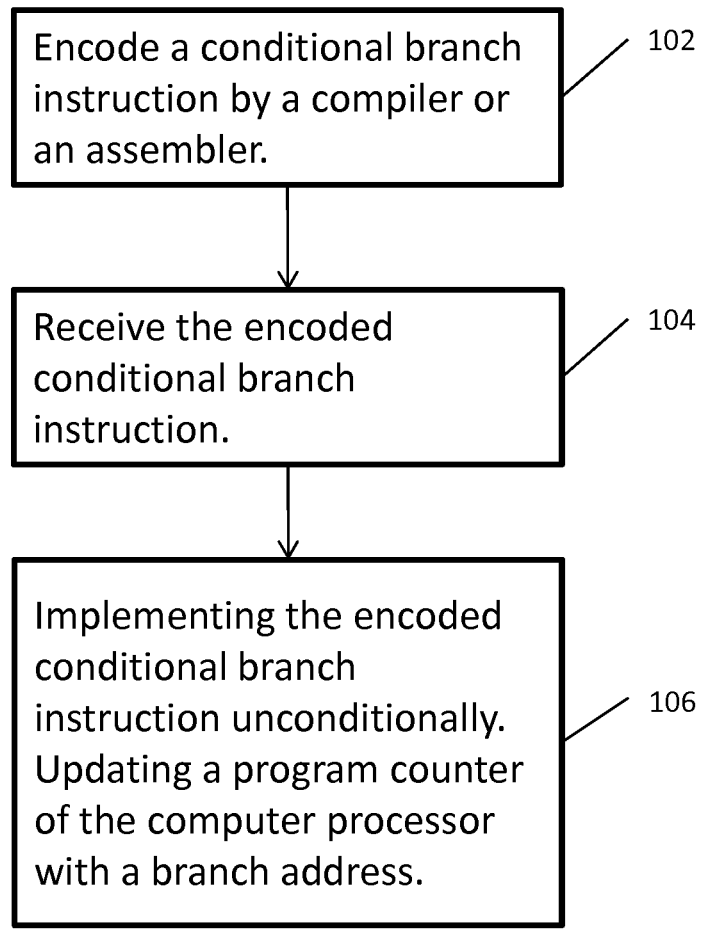
FIG. 1 shows method for testing whether a computer processor is capable of executing a requested instruction set in accordance with one embodiment of the present invention.

The present invention is described with reference to embodiments of the invention. Throughout the description of the invention reference is made to FIGS. 1-4. When referring to the figures, like structures and elements shown throughout are indicated with like reference numerals.

FIG. 1 shows method for testing whether a computer processor is capable of executing a requested instruction set in accordance with one embodiment of the present invention. As used herein, the term instruction set may also be referred to as a facility. The method includes an encoding step 102.

During the encoding step 102, a compiler or an assembler receives a conditional execution code and generates an encoded conditional branch instruction in the form of machine code executable directly by the computer processor. After the encoding step 102 is completed, the method continues to receiving step 104.

At the receiving step 104, the computer processor receives the encoded conditional branch instruction in a form of machine code executable directly by the computer processor. After the receiving step 104 is completed, the method continues to implementing step 106.

At the implementing step 106, the encoded conditional branch instruction is implemented unconditionally, based on underlying hardware architecture of the computer processor. In one embodiment, the decoding step 106 includes updating a program counter of the computer processor with an unconditional branch address if the computer processor is capable of executing the requested instruction set. As used herein, the term program counter may also be referred to as a PSW.

Figure 2:
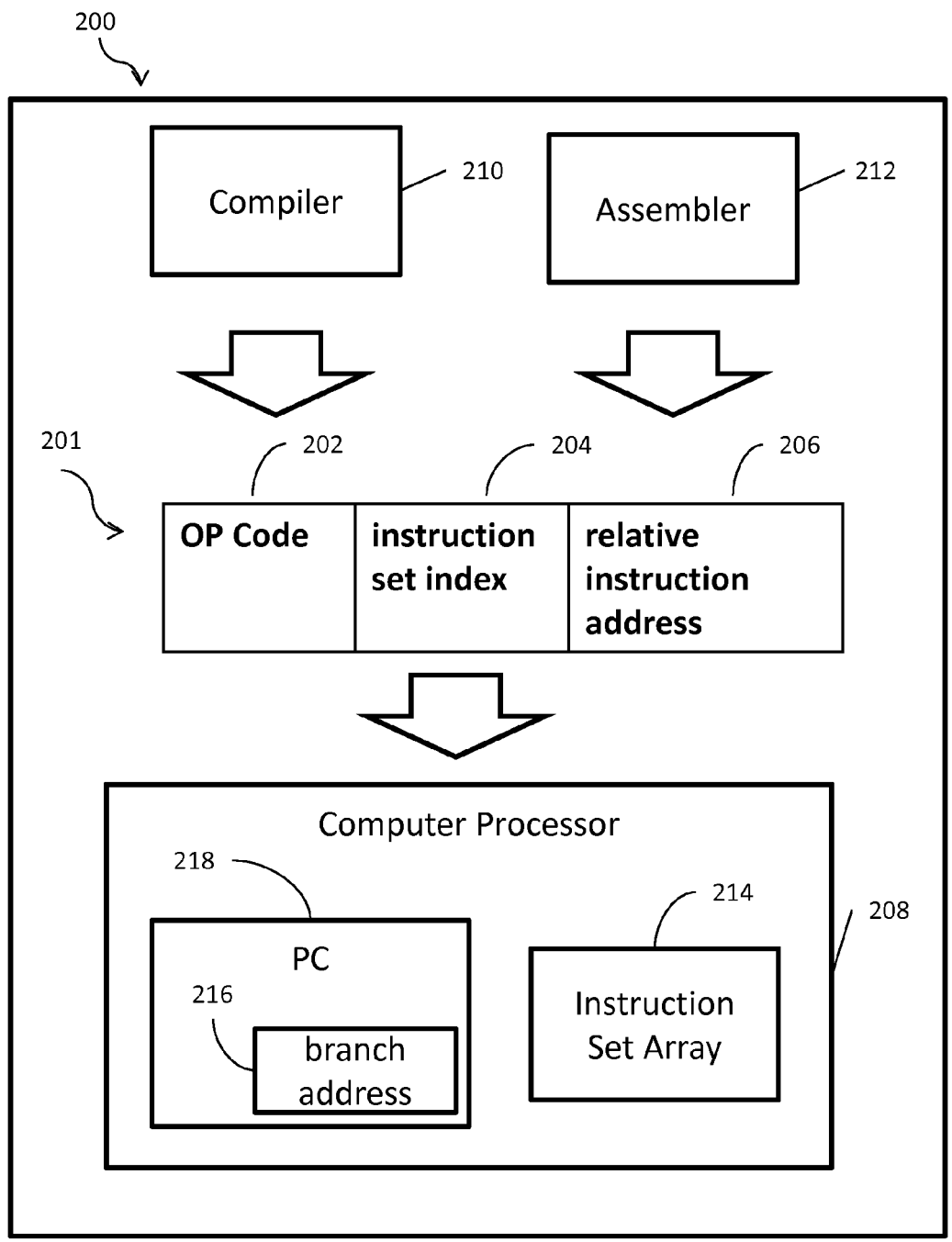
FIG. 2 shows a system for testing whether a computer processor is capable of executing a requested instruction set.

FIG. 2 shows a system 200 for testing whether a computer processor is capable of executing a requested instruction set. The system 200 includes a computer processor 208, and a compiler 210, or an assembler 212.

The compiler 210 or assembler 212 is configured to receive a conditional execution code and generate the encoded conditional branch instruction in the form of machine code executable directly by the computer processor.

The encoded conditional branch instruction 201 is in a bit array format comprising of an operation code field 202, an instruction set index field 204, and a relative instruction address field 206. The operation code field 202 represents the encoded conditional branch instruction 201. The instruction set index field 204 contains an index value into an instruction set array 214. As used herein, the term instruction set array may also be referred to as a facility array. The relative instruction address field 206 contains an offset address for updating the branch address 216 of the program counter 218.

The computer processor 208 includes a program counter 218 and instruction set array 214. The instruction set array 214 contains bit value indicating whether an instruction set is executable by the computer processor.

The computer processor 208 may receive the encoded conditional branch instruction 201 in a form of machine code executable directly by the computer processor 208 and may implement the encoded conditional branch instruction 201 unconditionally, based on underlying hardware architecture of the computer processor 208.

In one embodiment, decoding the encoded conditional branch instruction 201 includes updating a program counter 218 of the computer processor 208 with an unconditional branch address 216 if the computer processor 208 is capable of executing the requested instruction set.

In one embodiment, the program counter 218 is updated by adding the offset address when the bit value of the instruction set array 214 corresponding with the index value of the instruction set index field is 1. In another embodiment, the program counter 218 is updated by adding the offset address when the bit value of the instruction set array 214 corresponding with the index value of the instruction set index field is 0.

Figure 3:
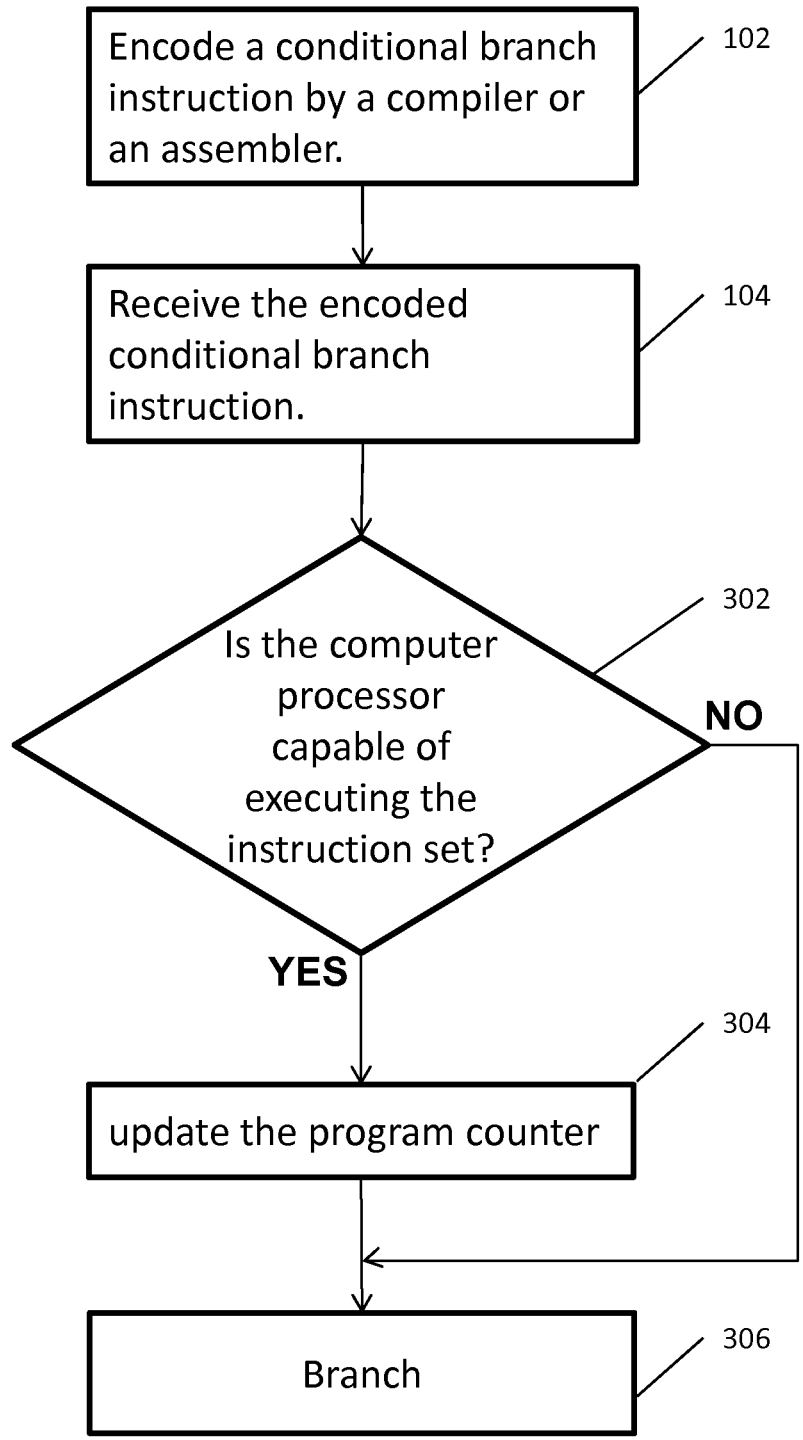
FIG. 3 shows another embodiment of method for testing whether a computer processor is capable of executing a requested instruction set in accordance with one embodiment of the present invention.

FIG. 3 shows another embodiment of method for testing whether a computer processor is capable of executing a requested instruction set in accordance with one embodiment of the present invention. According to this embodiment, the method includes a determining step 302.

During the determining step 302, the determining if the computer processor is capable of executing the instruction set includes checking the bit value of instruction set array that corresponds with index value of the instruction set index field. After the determination step 302 is completed, the method continues to an updating step 304.

At updating step 304, the program counter is updated by adding the offset address, according to the determination of the determining step 302. In one embodiment, the program counter is updated when the bit value of the instruction set array corresponding with the index value of the instruction set index field is 1. In another embodiment, the program counter is updated when the bit value of the instruction set array corresponding with the index value of the instruction set index field is 0. After the updating step 304 is completed, the method continues to a branch step 306.

At branch step 306, the instruction sequencing proceeds with the instruction address in the program counter.

Accordingly, one embodiment of the invention may use the z/Architecture as an example. Such embodiment may contain a bit array in memory for a facility array, with one bit representing each available facility (this already exists in z/Architecture). New instructions are to check a bit in the Facility Array and branch to a designated relative instruction address depending on whether the bit checked is 1 or 0. These instructions may be called BFA (Branch on Facility Available) and BFNA (Branch on Facility Not Available).

In z/Architecture example, the BFA/BFNA instruction may be in a SIL (storage-and-immediate operation, with a 16-bit immediate field) format.

Figure 4:
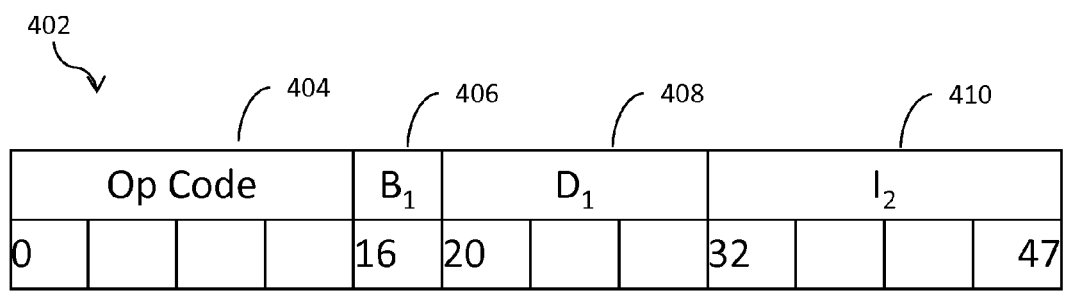
FIG. 4 shows an embodiment of the encoded conditional instruction format.

FIG. 4 shows an embodiment of the SIL format 402. The SIL format 402 may comprise of an Op code field 404 that holds the operation code, $B_1$ field 406 with value always '0,' $D_1$ field 408 which may be an unsigned integer that functions as an index into the Facility Array, and $I_2$ field 410 that holds a Relative instruction address.

In one embodiment of the invention, the index operand ($D_1$) may be 12-bit, and provide index for 4096 different facilities, which should be enough, even for a long-lived architecture, given the fact that the highest facility bit currently assigned in z/Architecture is 77.

Proposed embodiment of instruction operation may work as follows: the instruction address in the current PSW is replaced by the branch address if the Facility Array bit indicated by $D_1$ is one (for BFA) or zero (for BFNA); otherwise, normal instruction sequencing proceeds with the updated instruction address. The contents of the $D_1$ field may be an unsigned binary integer specifying an index into the Facility Array. The contents of the $I_2$ field may be a signed binary integer specifying the number of halfwords that is added to the address of the instruction to generate the branch address.

Traditional test instructions had following problems:

1. The Test (TM) instruction alters the condition code. It may be necessary to save it prior to making the test (and restore it afterwards).

2. The test/branch technique contains a conditional branch which is potentially disruptive to processor pipelines and/or requires branch prediction.

3. It may not be worth optimizing the code for short sequences of instructions (the addition of the Test and Branch instructions may negate the CPU savings from using new instructions).

According to the embodiment of this invention, the conditional execution code from a software programmer's perspective does not change by the instructions, but BFA and BFNA are effectively unconditional branches on any given machine, and are hence pipeline-friendly.

The difference with other approach is that the proposed instructions are very simple, and it should be easy to add them to existing machines via a microcode upgrade.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing whether a computer processor is capable of executing a requested instruction set, the method comprising:
   receiving an encoded conditional branch instruction in a form of machine code executable directly by the computer processor; and
   implementing the encoded conditional branch instruction unconditionally, based on underlying hardware architecture of the computer processor;
   wherein implementing the encoded conditional branch instruction includes updating a program counter of the computer processor with an unconditional branch address if the computer processor is capable of executing the requested instruction set;
   wherein the computer processor further includes an instruction set array that each bit value contained indicates whether an instruction set is executable by the computer processor;
   wherein the encoded conditional branch instruction is in a bit array format comprising:
      an operation code field representing the encoded conditional branch instruction;
      an instruction set index field containing an index value into the instruction set array; and
      a relative instruction address field containing an offset address for updating the program counter;
   wherein the program counter is updated by adding the offset address when the corresponding bit value of the instruction set array is 1.

2. The method of claim 1, wherein the encoded conditional branch instruction is generated from a conditional execution code received by a compiler or an assembler.

3. A method for testing whether a computer processor is capable of executing a requested instruction set, the method comprising:
   receiving an encoded conditional branch instruction in a form of machine code executable directly by the computer processor; and
   implementing the encoded conditional branch instruction unconditionally, based on underlying hardware architecture of the computer processor;
   wherein implementing the encoded conditional branch instruction includes updating a program counter of the computer processor with an unconditional branch address if the computer processor is capable of executing the requested instruction set;

wherein the computer processor further includes an instruction set array that each bit value contained indicates whether an instruction set is executable by the computer processor;

wherein the encoded conditional branch instruction is in a bit array format comprising:
  an operation code field representing the encoded conditional branch instruction;
  an instruction set index field containing an index value into the instruction set array; and
  a relative instruction address field containing an offset address for updating the program counter;

wherein the program counter is updated by adding the offset address when the corresponding bit value of the instruction set array is 0.

4. The method of claim 3, wherein the encoded conditional branch instruction is generated from a conditional execution code received by a compiler or an assembler.

* * * * *